United States Patent
Rinholm et al.

(10) Patent No.: US 7,637,090 B2
(45) Date of Patent: Dec. 29, 2009

(54) ROLLER CONFIGURATION HAVING REDUCED OVERLAP FOR A GRASS MOWING MACHINE

(75) Inventors: Brent G. Rinholm, Fuquay-Varina, NC (US); Tracy T. Lanier, Garner, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/873,477

(22) Filed: Oct. 17, 2007

(65) Prior Publication Data

US 2009/0100816 A1    Apr. 23, 2009

(51) Int. Cl.
A01D 34/53   (2006.01)

(52) U.S. Cl. .................................... 56/249

(58) Field of Classification Search ............ 56/249, 56/294, 7, 6, DIG. 10, 17.2
See application file for complete search history.

(56) References Cited

U.S. PATENT DOCUMENTS

| | | | | |
|---|---|---|---|---|
| 2,032,784 A | * | 3/1936 | Worthington | 56/7 |
| 2,088,293 A | * | 7/1937 | Funk | 56/249 |
| 2,168,706 A | * | 8/1939 | George et al. | 56/7 |
| 2,528,116 A | * | 10/1950 | Clemson | 56/249 |
| 2,624,168 A | * | 1/1953 | Clemson | 56/249 |
| 2,646,658 A | * | 7/1953 | Dunham | 56/249 |
| 3,118,268 A | * | 1/1964 | Benz | 56/249 |
| 3,628,318 A | * | 12/1971 | Grobowski | 56/249 |
| 4,947,630 A | * | 8/1990 | Rich et al. | 56/249 |
| 5,036,655 A | * | 8/1991 | Holloway | 56/256 |
| 5,343,680 A | * | 9/1994 | Reichen et al. | 56/249 |
| 5,394,681 A | * | 3/1995 | Nolan et al. | 56/249 |
| 5,497,603 A | * | 3/1996 | Short | 56/7 |
| 5,511,365 A | * | 4/1996 | Rice | 56/7 |
| 5,623,817 A | | 4/1997 | Bricko et al. | |
| 5,634,325 A | | 6/1997 | Thorman et al. | |
| 5,678,396 A | * | 10/1997 | Thorman et al. | 56/7 |
| 5,829,235 A | * | 11/1998 | Rice et al. | 56/7 |
| 5,865,017 A | * | 2/1999 | Short | 56/7 |
| 5,950,409 A | * | 9/1999 | Davies | 56/249 |
| 6,044,637 A | | 4/2000 | Thier et al. | |

(Continued)

FOREIGN PATENT DOCUMENTS

EP    1685758    8/2006

(Continued)

OTHER PUBLICATIONS

TORO—8 Blade DPA Cutting Unit with 5 inch Reel—Reelmaster 5210 & 5410 Traction Units, Operator's Manual (16 pages) 2006.

Primary Examiner—Árpád Fábián-Kovács

(57) ABSTRACT

A roller configuration for a grass mowing machine is provided to reduce roller overlap marks. The roller configuration may be used on a grass mowing machine having a first row of cutting units and a second row of cutting units. Each cutting unit has a roller with a reduced diameter portion adjacent a full diameter end portion. The full diameter end portions of the rollers on the first row of cutting units are aligned with the reduced diameter portions of the rollers on the second row of cutting units during mowing operations, and the reduced diameter portions of the rollers on the first row of cutting units aligned with the full diameter end portions of the rollers on the second row of cutting units during mowing operations.

16 Claims, 3 Drawing Sheets

U.S. PATENT DOCUMENTS

| | | | |
|---|---|---|---|
| 6,058,687 A * | 5/2000 | Short | 56/7 |
| 6,082,086 A * | 7/2000 | Togoshi et al. | 56/199 |
| 6,131,377 A * | 10/2000 | Rice et al. | 56/7 |
| 6,336,312 B1 | 1/2002 | Bednar et al. | |
| 6,481,191 B1 * | 11/2002 | Short | 56/7 |
| 6,588,191 B2 | 7/2003 | Berndt et al. | |
| 6,732,500 B1 * | 5/2004 | Myers | 56/17.2 |
| 7,121,073 B2 * | 10/2006 | Schmidt et al. | 56/249 |
| 2003/0019195 A1 * | 1/2003 | Berndt et al. | 56/7 |
| 2005/0000203 A1 * | 1/2005 | Rogers et al. | 56/16.7 |
| 2007/0204581 A1 | 9/2007 | Reimers et al. | |
| 2007/0256400 A1 * | 11/2007 | Henson et al. | 56/6 |
| 2008/0060331 A1 * | 3/2008 | Phillips | 56/7 |
| 2008/0127619 A1 * | 6/2008 | Link | 56/6 |

FOREIGN PATENT DOCUMENTS

EP     1929855     6/2008

* cited by examiner

ROLLER CONFIGURATION HAVING REDUCED OVERLAP FOR A GRASS MOWING MACHINE

FIELD OF THE INVENTION

This invention relates generally to grass mowing machines, and particularly to a roller configuration having reducing overlap marks caused by rollers on grass mowing machines with at least two rows of cutting units.

BACKGROUND OF THE INVENTION

Grass mowing machines such as greens mowers, fairway mowers and trim mowers are commonly equipped with several cutting units, each cutting unit having one or more rollers that roll in contact with the ground for supporting the cutting unit during operation. The rollers may be vertically adjustable for establishing the height at which vegetation is cut. The rollers also may provide a desirable striping pattern on the turf by pressing down the grass after it is cut. For example, a smooth roller, typically coupled to the rear portion of the cutting unit, may smooth out or flatten the surface of the ground after the cutting unit has passed over it.

Many grass mowing machines have one or more cutting units in a first or front row, followed by one or more cutting units in a second row. Each cutting unit in the first and second rows may be laterally offset from one another so as to pass over and mow adjacent strips of ground. However, if a second row cutting unit's roller overlaps the path of a first row cutting unit, the striping pattern may be marred with roller overlap marks. Smooth rollers may leave overlap marks where rollers on the first and second rows of cutting units push the same grass down. Grooved rollers may leave overlap marks where the first and second rows of cutting units tend to stand the grass up more.

To reduce the overlap marks, some grass mowing machines have shortened the rear rollers. Although shortened rollers reduce the overlap marks, the shortened rollers fail to support the end of the cutting unit sufficiently to maintain a constant height of cut, and also may leave marks where the outside edges of the rollers dig into the turf. Additionally, some grass mowing machines have light weight hollow rear rollers. However, hollow rollers may fail to provide striping patterns that are desired.

It is desirable to reduce overlap marks from rollers on grass mowing machines having at least two rows of cutting units. It is desirable to reduce roller overlap while maintaining a constant specified height of cut.

SUMMARY OF THE INVENTION

A grass mowing machine having reduced roller overlap includes rollers with reduced diameter portions adjacent their full diameter end portions. The reduced diameter portions are positioned so that the full diameter end portion of the roller on each cutting unit in the front or first row is followed by the reduced diameter portion of the roller on each cutting unit in the second row. Additionally, the reduced diameter portion of the roller on each front row cutting unit is followed by the full diameter end portion of the roller on each second row cutting unit. As a result, where cutting units in the first and second rows overlap, the turf will not be traversed by more than one set of full diameter rollers. The reduced diameter portions of the rollers, which are about 10% to about 25% smaller in diameter than the full diameter end portions, will prevent or reduce overlap marks.

DESCRIPTION OF THE PREFERRED EMBODIMENT

Figure 1:
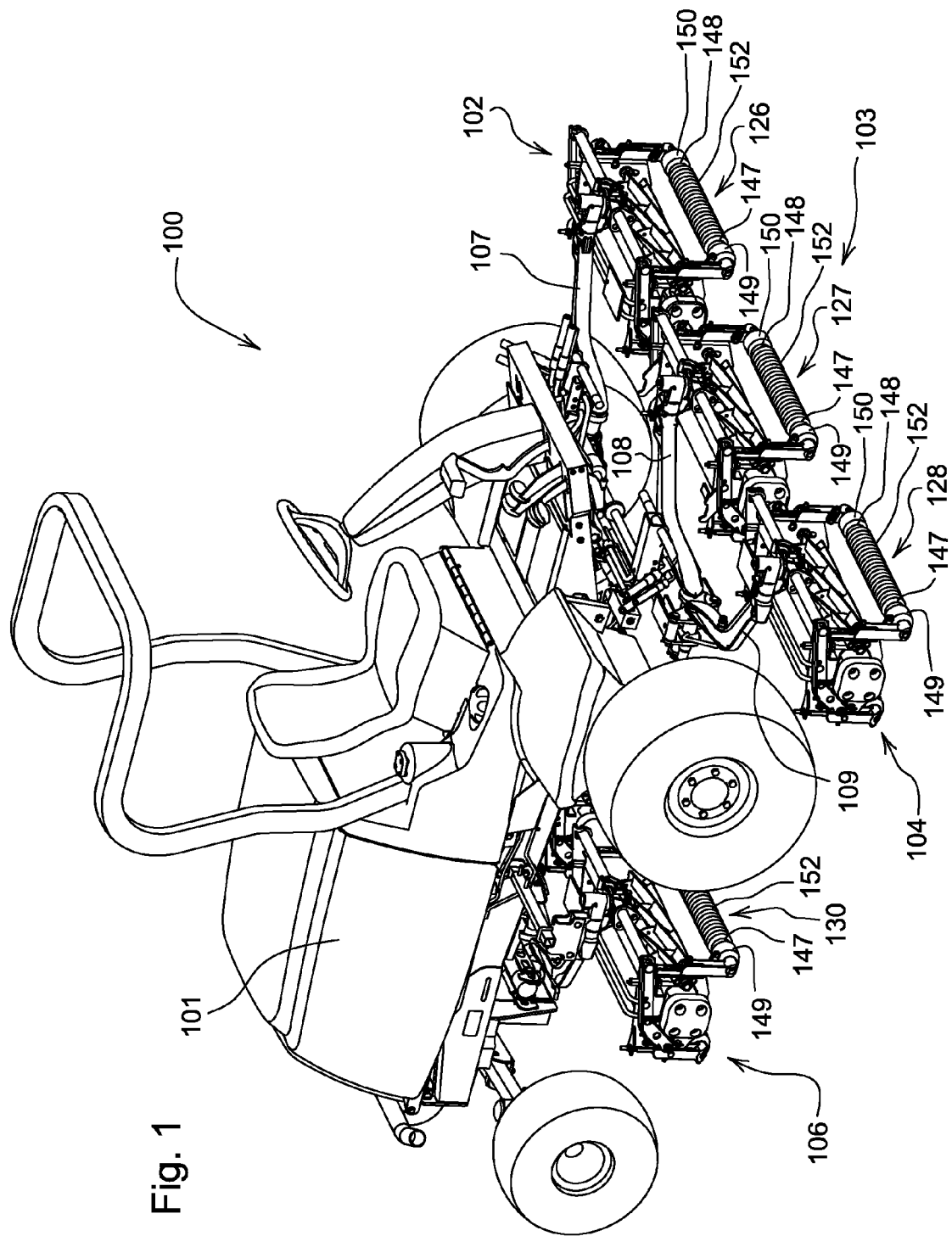
FIG. 1 is a perspective view of a grass mowing machine with roller overlap reduction according to a first embodiment of the invention.
Figure 2:
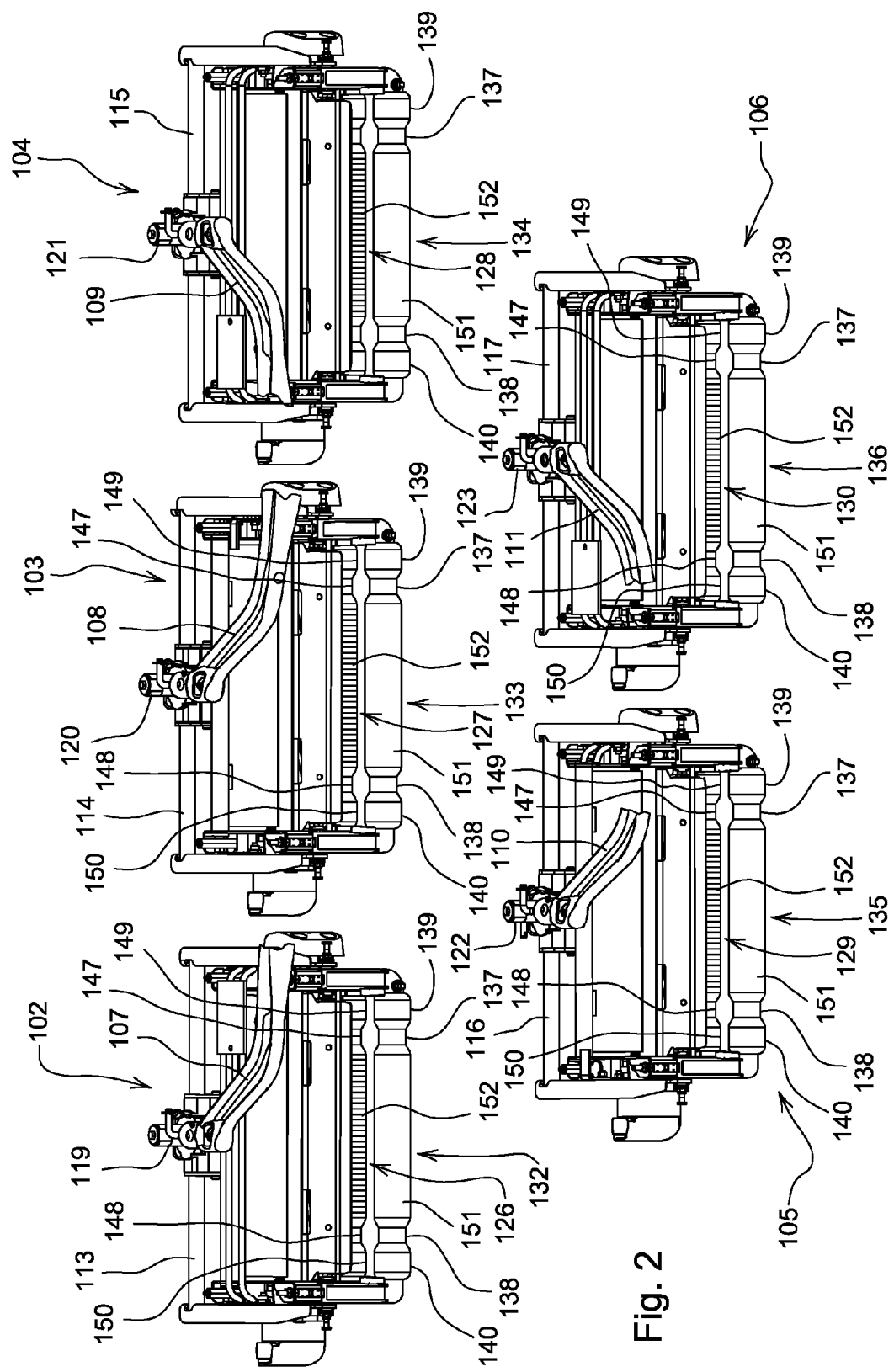
FIG. 2 is a top view of front and rear rows of cutting units with roller overlap reduction according to a first embodiment of the invention.

In one embodiment shown in FIG. 1, grass mowing machine 100 may be a fairway mower including traction vehicle 101 carrying a first or front row of three reel-type cutting units 102-04 and a second row of two reel-type cutting units 105-06. Alternatively, the grass mowing machine may be a greens mower or any other type of mower having two or more cutting units. The cutting units may be rotary or reel-type cutting units. In the embodiment of FIGS. 1-2, each cutting unit 102-06 may be connected to the outer end of a lift arm 107-11. A first or inner end of each lift arm may be pivotably attached to the frame or body of the traction vehicle, and the second or outer end may be pivotably attached to a cutting unit with a knuckle joint 119-23 to cross bar 113-17 or yoke supporting the cutting unit. While a cutting unit is on the ground surface, it may be supported with a front roller 126-30 and a rear roller 132-36.

Figure 3:
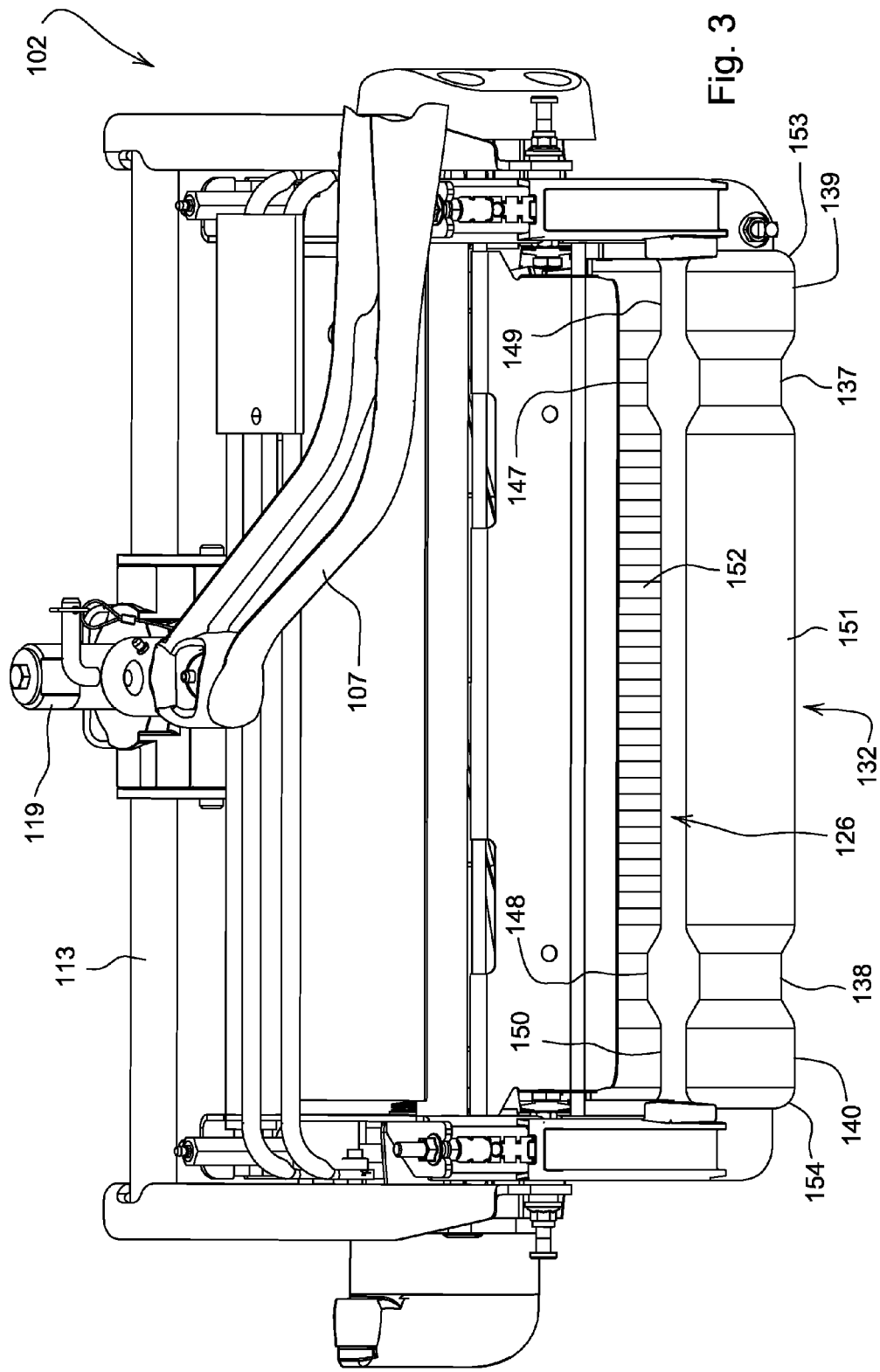
FIG. 3 is a top view of a cutting unit with overlap reduction according to a first embodiment of the invention.

Each cutting unit of FIGS. 1-3 is shown having a generally cylindrical cutting reel rotatable about a laterally extending horizontal axis. Each cutting reel includes blades which pass in close proximity to a bed knife, cutting vegetation with a shearing action. The front and rear rollers may be supported by brackets mounted to the cutting unit frame, and the brackets may be adjustable vertically for raising and lowering the cutting unit frame with respect to the rollers to adjust the height at which grass is cut.

In the embodiment shown in FIGS. 1-3, each cutting unit may have a cutting width of about 18 inches to about 36 inches. The second row of cutting units may cut swaths that overlap each cutting unit in the first or front row by about 2 to 6 inches, helping prevent or reduce uncut strips during turns. As a result, the total cutting width of the grass mowing machine may be less than the combined width of all the cutting units. For example, the total cutting width of a fairway mower having five 22 inch (55.9 cm) cutting units may be about 100 inches (254 cm).

In the embodiment of FIGS. 1-3, the length of each front and rear roller may be the same or within about 5% of the cutting width of each cutting unit. Each front roller 126-30 may have a plurality of circumferential or spiral grooves, while each rear roller 132-36 may have a smooth surface. In one embodiment, the front roller may have smooth end portions and a grooved center portion. The full diameter of each roller may be between about 2 inches (5.1 cm) and about 3 inches (7.6 cm). The full diameter of each roller normally is in contact with the ground surface during mowing operations.

In one embodiment, the ends of each roller may be slightly tapered. For example, as shown in FIG. 3, the ends of rear roller 132 may be slightly smaller than the full diameter, preferably not more than about 10% smaller than the full diameter. Tapered portions 153, 154 may increase in diameter from the roller ends to the full diameter about ½ inch from the ends.

In one embodiment, each rear roller has left and right reduced diameter portions 137, 138 adjacent the rear roller's full diameter end portions 139, 140, and each front roller has left and right reduced diameter portions 147, 148 adjacent the front roller's full diameter end portions 149, 150. The center portions 151, 152 of each roller also have full diameters. Only the center portions and end portions of each roller are in contact with the ground during normal mowing operations.

On each cutting unit, the reduced diameter portions are positioned so that the ground being mowed is traversed only once by a full diameter portion. The full diameter end portions of the rollers on the first row of cutting units are aligned with the reduced diameter portions of the rollers on the second row of cutting units, and the reduced diameter portions of the rollers on the first row of cutting units are aligned with the full diameter end portions of the rollers on the second row of cutting units. As the grass mowing machine moves forward, the full diameter end portions of the rollers on the first row of cutting units are followed by reduced diameter portions of the rollers on the second row of cutting units. Additionally, reduced diameter portions of the rollers on the first row of cutting units are followed by full diameter end portions of the rollers on the second row of cutting units. Where the cutting units overlap, the turf will not be smoothed or flattened by full diameter rollers on two cutting units.

In one embodiment, the reduced diameter portions 137, 138, 147, 148 may be about 10% to about 25% smaller in diameter than the full diameter end portions 139, 140, 149, 150. As a result, the reduced diameter portions will not smooth or flatten the turf, and the full diameter rollers on only one cutting unit will traverse the swath where the cutting units overlap. Additionally, each roller may be tapered or beveled between the reduced diameter portion and the full diameter portion.

In one embodiment, each reduced diameter portion may have a length that is the same or within about 5% of the length of the full diameter end portion. The length of each reduced diameter portion may be about half the overlap between the front and rear cutting units. For example, the length of each reduced diameter portion may be about 2 inches if the overlap between the front and rear cutting units is 4 inches. In the example, the full diameter end portion also has a length of about 2 inches.

Having described a preferred embodiment, it will become apparent that various modifications can be made without departing from the scope of the invention as defined in the accompanying claims.

The invention claimed is:

1. A roller configuration for a grass mowing machine, comprising:
    a first row of cutting units, each cutting unit having a roller with a full diameter center portion, a reduced diameter portion and a full diameter end portion; the reduced diameter portion is between the full diameter portions;
    a second row of cutting units, each cutting unit having a roller with a reduced diameter portion adjacent a full diameter end portion;
    whereby each full diameter end portion of the roller on the second row of cutting units follows the same path traversed by a reduced diameter portion of the roller on the first row of cutting units, and each reduced diameter portion of the roller on the second row of cutting units follows the same path traversed by a full diameter end portion of the roller on the first row of cutting units.

2. The roller configuration of claim 1 wherein each reduced diameter portion has the same length as each full diameter end portion.

3. The roller configuration of claim 1 wherein each roller is a rear roller having a smooth surface.

4. The roller configuration of claim 1 wherein each roller is a front roller having a grooved surface.

5. The roller configuration of claim 1 wherein the reduced diameter portion has a diameter of 10% to 25% less than the full diameter end portion.

6. A roller configuration for a grass mowing machine, comprising:
    a plurality of cutting units, each cutting unit having a front roller having a left full diameter end portion, a full diameter center portion and a right full diameter end portion, reduced diameter portions are between the center portion and each of the full diameter end portions; and
    a rear roller having a left full diameter end portion, a full diameter center portion and a right full diameter end portion, reduced diameter portions between the center portion and each of the full diameter end portions;
    whereby the left and right full diameter end portions of the front and rear rollers of each cutting unit are aligned laterally with a reduced diameter portion of the front and rear rollers of another cutting unit, and the reduced diameter portion of the front and rear rollers of each cutting unit are aligned laterally with the left and right full diameter end portions of the front and rear rollers of another cutting unit.

7. The roller configuration of claim 6 wherein each front and rear roller is tapered between the full diameter end portion and the reduced diameter portion.

8. The roller configuration of claim 6 wherein each reduced diameter portion has the same length as each full diameter end portion.

9. The roller configuration of claim 6 wherein the center portion has a spiral groove.

10. The roller configuration of claim 6 further comprising a first row of three cutting units followed by a second row of two cutting units.

11. The roller configuration of claim 6 wherein the diameter of the reduced diameter portion is between 10% and 25% less than the full diameter.

12. A roller configuration for a grass mowing machine, comprising:
    a first row of cutting units supported by front and rear rollers; at least one of the front and rear rollers having a full diameter end portion, a full diameter center portion, and a reduced diameter portion is between the full diameter portions; and
    a second row of cutting units supported by front and rear rollers; at least one of the front and rear rollers having a full diameter end portion, a full diameter center portion, and a reduced diameter portion between the full diameter portions;
    whereby a full diameter end portion on the second row of cutting units follows the same path traversed by a reduced diameter portion on the first row of cutting units, and a reduced diameter portion on the second row of cutting units follows the same path traversed by a full diameter end portion on the first row of cutting units.

13. The roller configuration of claim 12 wherein the reduced diameter portions are 10% to 25% smaller in diameter than the full diameter end portions.

14. The roller configuration of claim 12 wherein the first and second rows of cutting units overlap where the reduced diameter portions are positioned.

15. The roller configuration of claim 12 wherein each roller is tapered between the reduced diameter portion and the full diameter end portion.

16. The roller configuration of claim 12 wherein each front roller is grooved.

* * * * *